(12) United States Patent
Kim et al.

(10) Patent No.: US 11,155,266 B2
(45) Date of Patent: Oct. 26, 2021

(54) ACTIVE ROLL CONTROL APPARATUS AND METHOD

(71) Applicants: Hyundai Motor Company, Seoul (KR); Kia Motors Corporation, Seoul (KR)

(72) Inventors: Byoung-Joo Kim, Seoul (KR); Eun-Woo Na, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 327 days.

(21) Appl. No.: 16/380,679

(22) Filed: Apr. 10, 2019

(65) Prior Publication Data
US 2020/0062261 A1 Feb. 27, 2020

(30) Foreign Application Priority Data
Aug. 21, 2018 (KR) .................. 10-2018-0097490

(51) Int. Cl.
*B60W 30/045* (2012.01)
*B60W 30/18* (2012.01)
*B60W 40/109* (2012.01)

(52) U.S. Cl.
CPC .... *B60W 30/18145* (2013.01); *B60W 30/045* (2013.01); *B60W 40/109* (2013.01); *B60W 2510/205* (2013.01); *B60W 2520/10* (2013.01); *B60W 2520/125* (2013.01); *B60W 2520/14* (2013.01); *B60W 2552/40* (2020.02); *B60W 2720/18* (2013.01)

(58) Field of Classification Search
CPC ......... B60W 30/18145; B60W 40/109; B60W 30/045; B60W 2552/40; B60W 2720/18; B60W 2510/205; B60W 2520/10; B60W 2520/125; B60W 2520/14; B60G 17/0195; B60G 2400/40; B60G 2800/912; B60G 17/0162; B60G 17/016
See application file for complete search history.

(56) References Cited

U.S. PATENT DOCUMENTS

| 7,552,928 B2 * | 6/2009 | Cayzeele | B60G 21/0555 280/5.506 |
|---|---|---|---|
| 8,915,554 B2 | 12/2014 | Sekiya | |
| 2005/0143885 A1 * | 6/2005 | Nimmo | B60W 30/04 701/38 |
| 2006/0006615 A1 * | 1/2006 | Mizuta | B60W 30/045 280/5.508 |
| 2009/0084616 A1 * | 4/2009 | Kezobo | B62D 5/0481 180/6.44 |

(Continued)

FOREIGN PATENT DOCUMENTS

| JP | 4459561 B2 | 2/2010 |
|---|---|---|
| JP | 5692516 B2 | 2/2015 |

(Continued)

*Primary Examiner* — Genna M Mott
(74) *Attorney, Agent, or Firm* — Mintz Levin Cohn Ferris Glovsky and Popeo, P.C.; Peter F. Corless

(57) ABSTRACT

An active roll control apparatus is provided. The apparatus includes a first actuator that is disposed adjacent to front wheels or rear wheels and is configured to adjust roll stiffness. A controller operates the first actuator in a reverse phase control manner in a roll angle increasing direction when a vehicle is in a low-friction turning driving state.

17 Claims, 4 Drawing Sheets

(56) References Cited

U.S. PATENT DOCUMENTS

2013/0103279 A1     4/2013   Asano
2014/0324294 A1*   10/2014   Champagne ........... B62D 5/049
                                                                              701/41

FOREIGN PATENT DOCUMENTS

| JP | 6048253 B2 | 12/2016 |
| --- | --- | --- |
| KR | 2008-0111284 A | 12/2008 |
| KR | 2016-0053567 A | 5/2016 |
| KR | 1020170098438 A | 8/2017 |

* cited by examiner

ACTIVE ROLL CONTROL APPARATUS AND METHOD

CROSS-REFERENCE(S) TO RELATED APPLICATIONS

This application claims priority to Korean Patent Application No. 10-2018-0097490 filed on Aug. 21, 2018, which is incorporated herein by reference in its entirety.

BACKGROUND

Field of the Invention

The present invention relates to wheel control technology for vehicles and, more particularly, to active roll control apparatus and method for controlling rear wheels of a vehicle in a reverse phase control manner.

Description of Related Art

A front and rear wheel distribution ratio control method based on a yaw rate estimation error has been developed. In the developed method, a yaw rate error is calculated based on information obtained by a vehicle speed sensor and a steering angle sensor, and a front and rear wheel distribution ratio control operation is performed based on the yaw rate error. In particular, if the yaw rate is excessive, a rear wheel distribution ratio is reduced. In contrast, when the yaw rate is insufficient, the distribution ratio is increased. In other words, only the distribution ratio control operation is performed without changing in the total amount of control or the direction.

However, such distribution ratio control is problematic in that under low-friction driving conditions in which the stability needs to be secured, tire grip force/lateral force is reduced. Therefore, compared to typical vehicles, the vehicle stability deteriorates, for example, the probability of spin-out increases, or the grip limit range decreases.

SUMMARY

An exemplary embodiment of the present invention is directed to active roll control apparatus and method for controlling rear wheels of a vehicle in a reverse phase control manner.

Other objects and advantages of the present invention may be understood by the following description, and become apparent with reference to the exemplary embodiments of the present invention. Also, it is obvious to those skilled in the art to which the present invention pertains that the objects and advantages of the present invention may be realized by the means as claimed and combinations thereof.

In accordance with an exemplary embodiment of the present invention, an active roll control apparatus may include: a first actuator disposed adjacent to front wheels or rear wheels, and configured to adjust roll stiffness; and a controller configured to operate the first actuator in a reverse phase control manner in a roll angle increasing direction when a vehicle is in a low-friction turning driving state.

The active roll control apparatus may further include a vehicle sensor configured to generate vehicle state information. The controller may be configured to determine whether the vehicle is in the low-friction turning driving state using the vehicle state information. The first actuator may be disposed adjacent to the rear wheels. The active roll control apparatus may further include a second actuator disposed adjacent to the front wheels or the rear wheels, and configured to adjust roll stiffness. The controller may be configured to operate the second actuator in a roll angle reducing direction at a control rate greater than a control rate used when the vehicle is in a normal turning driving state. The normal turning driving state is to maintain a normal active roll stabilization (ARS) control operation so that the vehicle can drive at current steering conditions. The second actuator may be disposed adjacent to the front wheels.

Additionally, the vehicle state information may include a vehicle speed, a steering angle, and a lateral acceleration. The determining of whether the vehicle is in the low-friction turning driving state may be performed by comparing a preset reference value and an estimation error between an actual lateral acceleration value and an estimation lateral acceleration value estimated based on the vehicle speed and the steering angle. The estimation lateral acceleration value may be calculated using an Ackermann vehicle model, which is a 2-degree-of-freedom vehicle dynamics model.

Under fine steering conditions, the first actuator may be prevented from being operated in the reverse phase manner in the roll angle increasing direction. The controller may be configured to determine whether the vehicle is under the fine steering conditions using the vehicle state information. The vehicle state information may include a vehicle speed, a lateral acceleration, a yaw rate, a steering angle, and a steering angular speed. The determining of whether the vehicle is in the fine steering conditions may be performed using the vehicle speed, the lateral acceleration, the yaw rate, the steering angle, and the steering angular speed.

In accordance with an exemplary embodiment of the present invention, an active roll control apparatus may include: a vehicle sensor configured to generate vehicle state information; a first actuator disposed adjacent to front wheels and configured to adjust roll stiffness; a second actuator disposed adjacent to rear wheels and configured to adjust roll stiffness; and a controller configured to determine whether a vehicle is in a low-friction driving state using the vehicle state information, and operate the first actuator and the second actuator to perform a steering stability improvement control operation or a normal control operation based on a result of the determination.

In accordance with an exemplary embodiment of the present invention, an active roll control method may include: generating vehicle state information using a vehicle sensor; determining, by a controller, whether a vehicle is in a low-friction driving state using the vehicle state information; performing, by the controller, a steering stability improvement control operation or a normal control operation based on a result of the determination; and adjusting, by a first actuator disposed adjacent to front wheels and a second actuator disposed adjacent to rear wheels, roll stiffness based on the steering stability improvement control operation or the normal control operation.

DETAILED DESCRIPTION

Figure 1:
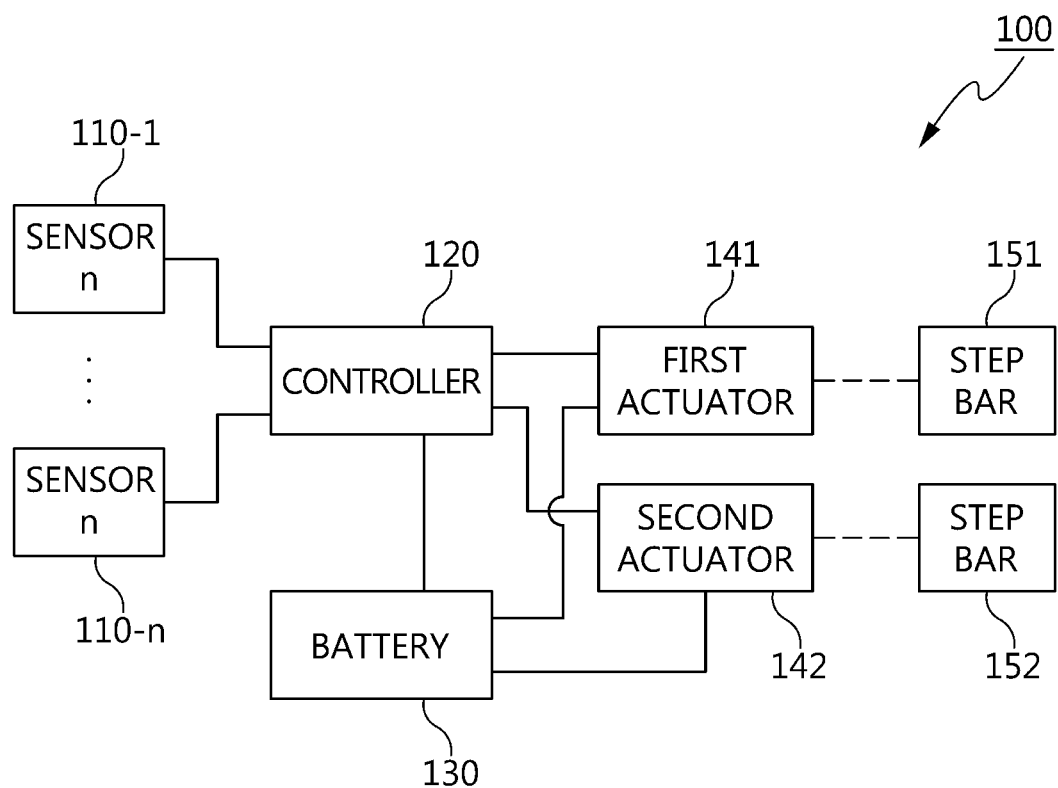
FIG. 1 is a block diagram illustrating the configuration of an active roll control apparatus according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to various exemplary embodiments of the present invention, specific examples of which are illustrated in the accompanying drawings and described below, since the exemplary embodiments of the present invention can be variously modified in many different forms. However, this is not intended to limit the present invention to particular modes of practice, and it is to be appreciated that all changes, equivalents, and substitutes that do not depart from the spirit and technical scope of the present invention are encompassed in the present invention.

Like reference numerals refer to like parts throughout the various figures and embodiments of the present invention. It will be understood that, although the terms "first", "second", etc. may be used herein to describe various elements, these elements should not be limited by these terms. These terms are only used to distinguish one element from another element.

For instance, a first element discussed below could be termed a second element without departing from the teachings of the present invention. Similarly, the second element could also be termed the first element. The term "and/or" includes any and all combinations of one or more of the associated listed items. Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Hereinafter, active roll control apparatus and method according to exemplary embodiments of the present invention will be described in detail with reference to accompanying drawings.

FIG. 1 is a block diagram illustrating the configuration of an active roll control apparatus 100 according to an exemplary embodiment of the present invention. Referring to FIG. 1, the active roll control apparatus 100 may include first to n-th vehicle sensors 110-1 to 110-$n$, a controller 120, actuators 141 and 142, and a battery 130. The first to n-th vehicle sensors 110-1 to 110-$n$ may be configured to generate vehicle state information. The controller 120 may be configured to determine whether the vehicle is in a low-friction driving state using the vehicle state information, and perform a steering stability improvement control operation or a normal control operation based on a result of the determination. The actuators 141 and 142 may be configured to adjust roll stiffness by operating step bars 151 and 152 under control of the controller 120. The battery 130 may be configured to supply power to electronic components.

The first to n-th vehicle sensors 110-1 to 110-$n$ may include a vehicle speed sensor, a steering angle sensor, a yaw rate sensor, a lateral acceleration sensor, and the like. The first to n-th vehicle sensors 110-1 to 110-$n$ may be installed at appropriate positions inside and outside the vehicle and coupled to the controller 120. The first to n-th vehicle sensors 110-1 to 110-$n$ may be configured to generate vehicle state information such as a vehicle speed, a steering angle, a lateral acceleration, a yaw rate, and an angular speed, and transmit the vehicle state information to the controller 120.

The controller 120 may be configured to exchange data, signals, etc. with the electronic components of the vehicle and operate the electronic components. Although in FIG. 1 the single controller 120 has been illustrated as operating both the first and second actuators 141 and 142, the controller 120 may be formed of two controllers. In other words, the first and second actuators 141 and 142 may be coupled with the respective controllers.

The first and second actuators 141 and 142 may be configured to operate corresponding step bars 151 and 152 under control of the controller 120. When vehicle roll occurs, the first and second actuators 141 and 142 may be operated to forcibly lift a corresponding side of the vehicle body, thus minimizing the rolling motion. Particularly, a driving control circuit 130 may be configured to perform a rear-wheel reverse-phase control operation in which a reverse phase control operation is executed in a roll angle increasing direction, and a front-wheel control-rate increasing operation of increasing a control rate for the front wheels. In other word, deformation of a suspension (not shown) may be induced by the rear-wheel reverse-phase control operation, whereby roll steer/lateral force steer may be secured. In particular, under-steer may be increased, and the vehicle stability may be enhanced.

In FIG. 1, each of the first and second step bars 151 and 152 has been illustrated as being a single step bar, but each of the first and second step bars 151 and 152 may be formed of a pair of step bars, and the first and second step bars 151 and 152 may be respectively installed adjacent to the front and rear wheels. Particularly, the first actuator 141 may be disposed adjacent to the front wheels, and a pair of first step bars 151 installed adjacent to the respective opposite front wheels may be coupled to the first actuator 141. Additionally, the pair of first step bars 151 may be coupled to respective opposite suspensions (not shown). The second actuator 142 may be disposed adjacent to the rear wheels, and a pair of second step bars 152 installed adjacent to the respective opposite rear wheels may be coupled to the second actuator 142. The pair of second step bars 152 may be coupled to respective opposite suspensions (not shown).

An electronic actuator may be used as each of the first and second actuators 141 and 142. The battery 130 may be configured to supply power to the vehicle sensors 110-1 to 110-n, the controller 120, the actuators 141 and 142, etc., which are the electronic components. A lead storage battery, or a secondary battery may be used as the battery 130. The secondary battery may include battery cells (not shown) which are configured in series and/or parallel. The battery cells may be high-voltage battery cells for electric vehicles such as nickel-metal battery cells, lithium-ion battery cells, lithium-polymer battery cells, solid-state battery cells, etc. Generally, a high-voltage battery may be a battery which is used as a power source for operating an electric vehicle, and may generate a high voltage of 100 V or more. However, the present invention is not limited thereto, and a low-voltage battery may be used.

Figure 2:
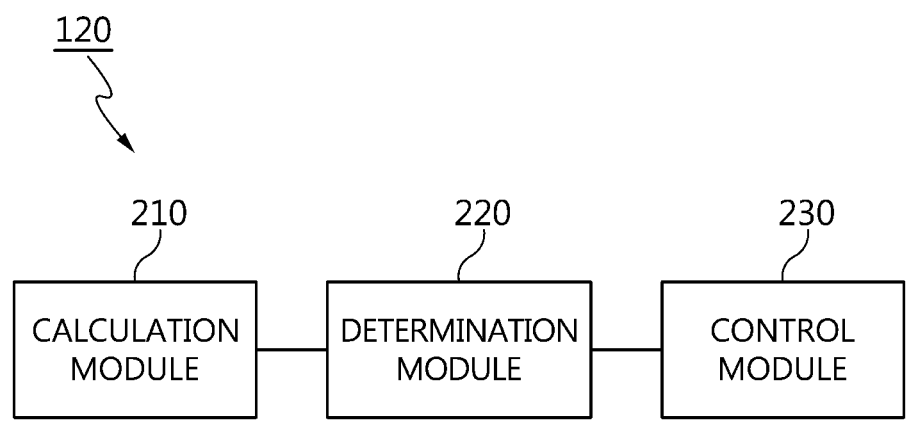
FIG. 2 is a block diagram illustrating in detail the configuration of a controller shown in FIG. 1 according to an exemplary embodiment of the present invention.

FIG. 2 is a block diagram illustrating in detail the configuration of the controller 120 shown in FIG. 1. Referring to FIG. 2, the controller 120 may include a calculation module 210, a determination module 220, and a control module 230. The calculation module 210 may be configured to calculate a lateral acceleration value estimated based on the vehicle speed and the steering angle of the vehicle state information. The determination module 220 may be configured to compare the estimation lateral acceleration value and an actual lateral acceleration value measured by the sensor, and determine whether the vehicle is in the low-friction driving state. The control module 230 may be configured to perform the steering stability improvement control operation or the normal control operation based on a result of the determination.

In particular, the calculation module 210 may be configured to calculate the estimation lateral acceleration value to determine whether a current driving state is the low-friction driving state. Generally, in the low-friction driving state, the lateral acceleration may be reduced under conditions of constant vehicle speed/steering angle input. Therefore, the estimation lateral acceleration value may be calculated using a 2-degree-of-freedom vehicle dynamics model. This may be expressed as the following equation.

$$Ay = \frac{\frac{V^2}{57.3\,Lg}}{1 + \frac{KV^2}{57.3\,Lg}} \delta[g] \qquad \text{Equation 1}$$

wherein, V denotes a vehicle speed, L denotes a distance between a pair of front or rear wheels, K denotes a gradient, δ denotes a steering angle, and g denotes a lateral axis.

The determination module 220 may be configured to compare a reference value and an estimation error between an estimation lateral acceleration value and an actual lateral acceleration value measured by the sensor, and determine whether the vehicle is in the low-friction driving state. Additionally, the determination module 220 may be configured to determine intervention conditions for the steering stability improvement control operation. In particular, under fine steering conditions, a control nonintervention operation may be performed to prevent roll unfamiliarity from occurring due to frequent control intervention. In other words, only when conditions of low-friction driving determination and conditions departing from a fine steering region are satisfied in an AND operation may the steering stability improvement control operation be performed.

Furthermore, the control module 230 may be configured to perform the steering stability improvement control operation by the determination module 220. In particular, the rear-wheel reverse-phase control operation and the front-wheel control-rate increasing operation may be performed. In other words, the control rate increasing operation may be performed on the front wheels to compensate for loss in roll moment due to the rear-wheel reverse-phase control operation and thus prevent unfamiliarity in driving from occurring. In the case of the rear wheels, a control operation may be performed in a roll angle increasing direction. In other words, a load shift rate due to a lateral acceleration may be offset, and a roll/lateral force steer generation rate may be increased. Accordingly, the stability of the vehicle may be enhanced by increasing the limit range of tire grip and the cornering force of the rear wheels.

The term "module" referred to in FIG. 2 means a unit for processing at least one function or operation, and this may be embodied in hardware, software or a combination of hardware and software. The hardware may be embodied in a device designed to perform the above-mentioned functions, for example, in an application specific integrated circuit (ASIC), a digital signal processing (DSP) device, a programmable logic device (PLD), a microprocessor, other electronic units, or a combination of them. The software may be embodied in a module configured to perform the foregoing function. The software may be stored in a memory unit and performed by a processor. The memory unit or the processor may employ various means known to those skilled in the art.

Figure 3:
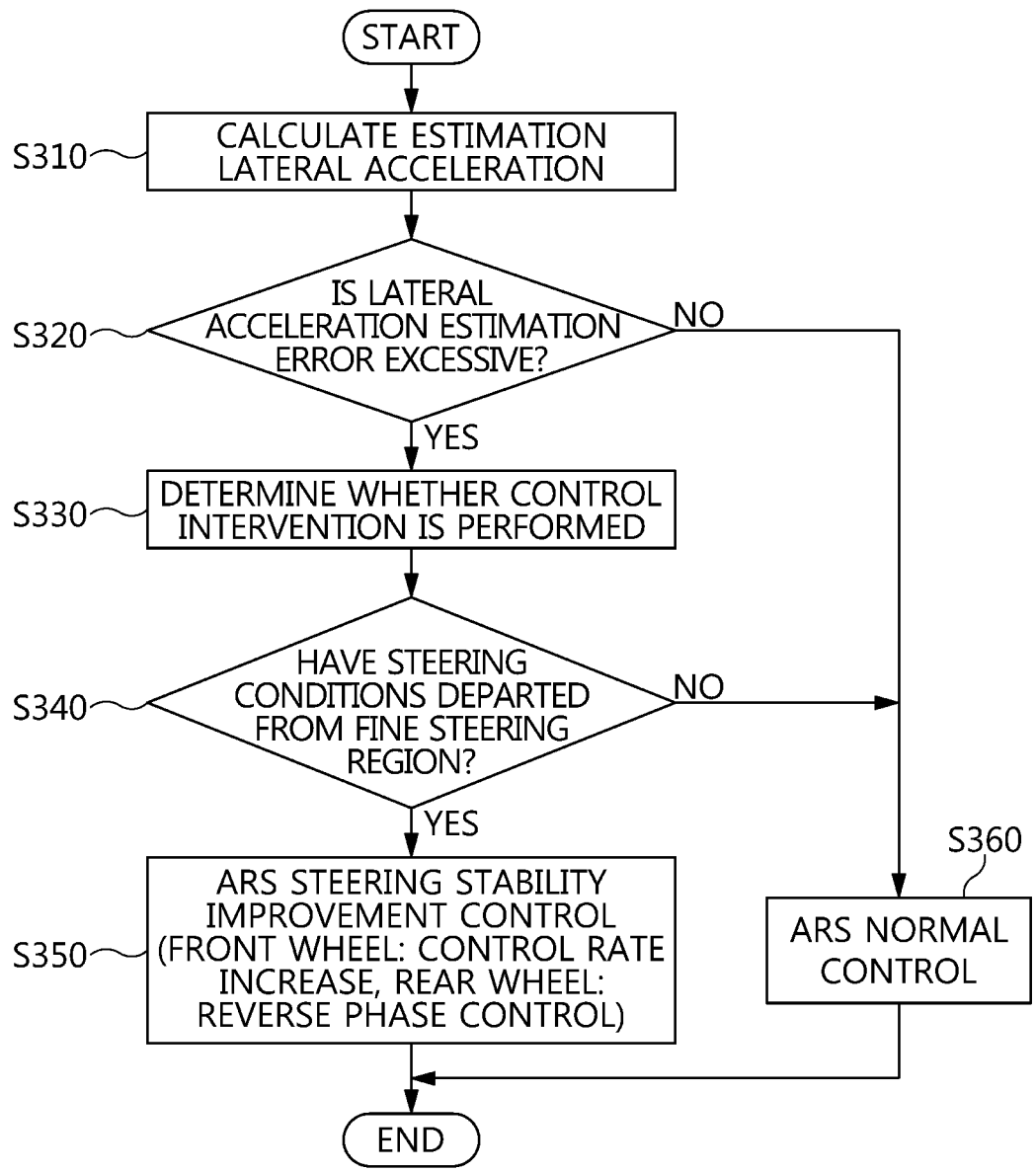
FIG. 3 is a flowchart illustrating a rear wheel control process according to an exemplary embodiment of the present invention.

FIG. 3 is a flowchart illustrating a rear wheel control process according to an exemplary embodiment of the present invention. Referring to FIG. 3, the rear wheel control process may be performed when the vehicle is being driven, and may start with ignition of an engine (not shown) of the vehicle. As the vehicle is driven, the controller (120 of FIG. 1) may be configured to estimate a lateral acceleration based on vehicle speed/steering angle information and calculate an estimation lateral acceleration value (at step S310). This process is a process of estimating the lateral acceleration using a 2-degree-of-freedom vehicle dynamics model.

Thereafter, the controller 120 may be configured to monitor, in real time, an error between the estimation lateral acceleration value and an actual lateral acceleration value measured by the vehicle sensor, and determine whether the estimation error is excessive (e.g., greater than a particular value) (at step S320). As a result of the determination at step S320, when the estimation error is excessive, the current driving state may be determined to be a low-friction driving state, and whether the control intervention is required may be determined (at step S330). In particular, whether the current driving conditions are driving conditions in which the steering stability improvement control operation is required may be determined to reduce the frequency of execution of the steering stability improvement control operation and thus prevent unfamiliarity from occurring.

Subsequently, the controller 120 may be configured to detect whether current steering conditions have departed from a preset fine steering region, based on the vehicle speed, the lateral acceleration, the yaw rate, the steering angle/angular acceleration signals (at step S340). As a result of the detection, when the current steering conditions have departed from the fine steering region, the steering stability improvement control operation may be performed (at step S350). In particular, a control rate increasing operation may be performed on the front wheels and a reverse phase control operation may be performed on the rear wheels.

In contrast, when the current steering conditions have not departed from the fine steering region (e.g., remain within the region) at step S340, the controller 120 may be configured to maintain a normal active roll stabilization (ARS) control operation (at step S360). Additionally, as a result of the determination at step S320, when the estimation error is not excessive, the controller 120 may be configured to maintain the normal ARS control operation (at step S360).

Figure 4:
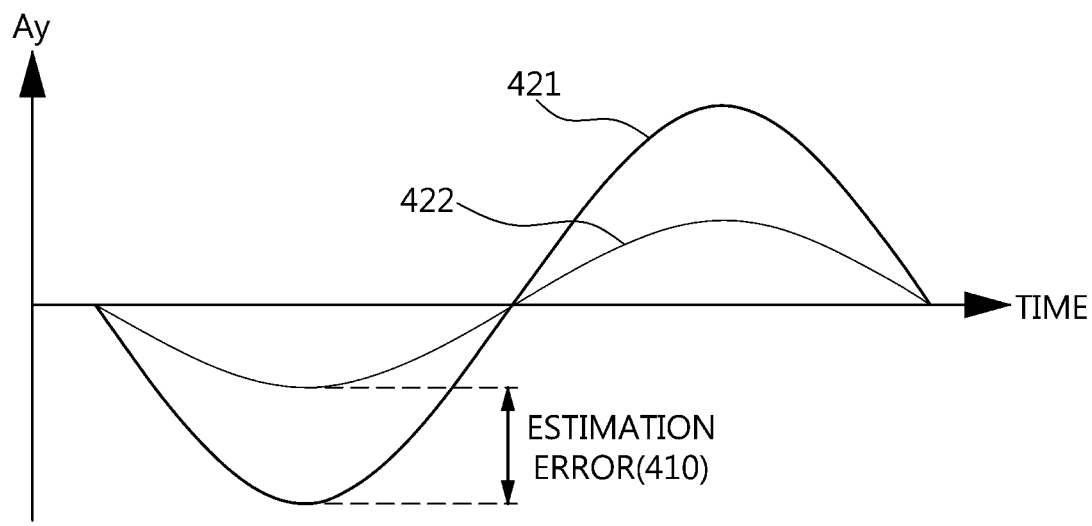
FIG. 4 is a graph illustrating a notion of determining a low-friction state according to an exemplary embodiment of the present invention.

FIG. 4 is a graph illustrating a notion of determining the low-friction state according to an exemplary embodiment of the present invention. Referring to FIG. 4, the estimation error may be defined by a difference value in lateral angle value between a normal road graph 421 and a low-friction state graph 422. When the estimation error 410 is about 30% or greater, the current driving state may be determined to be a low-friction driving state.

Figure 5:
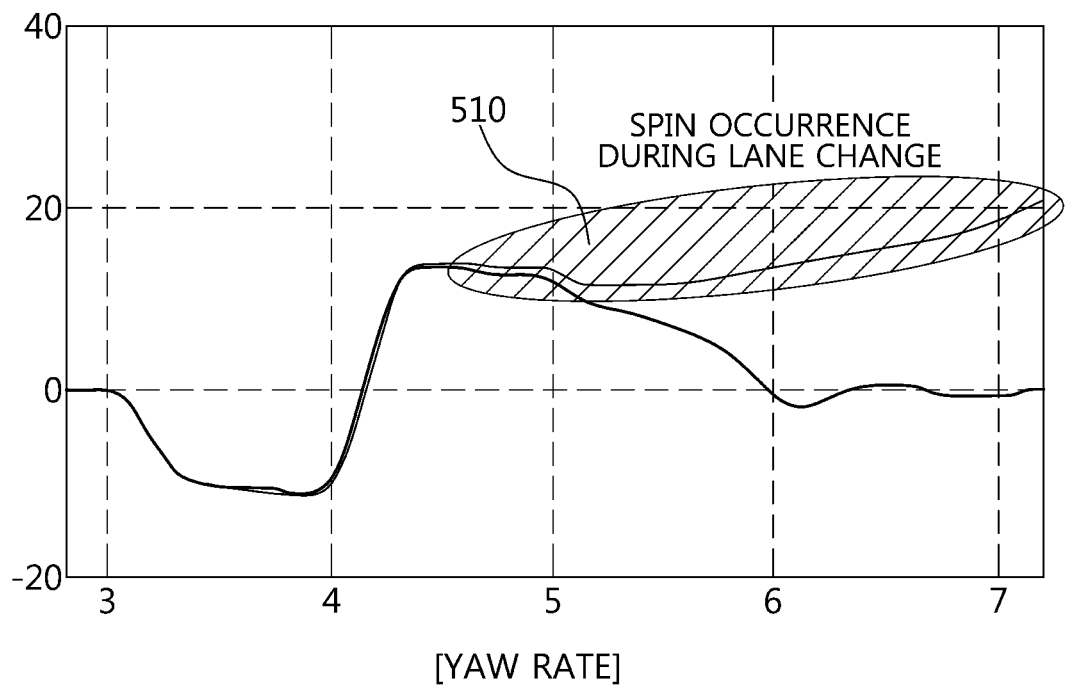
FIG. 5 is a graph illustrating a performance analysis result during lane change after it has been determined that a current driving state is a low-friction driving state, as a function of a yaw rate according to an exemplary embodiment of the present invention.

FIG. 5 is a graph illustrating a performance analysis result during lane change after it has been determined that the current driving state is the low-friction driving state, as a function of a yaw rate according to an exemplary embodiment of the present invention. Referring to FIG. 5, in the low-friction driving state, when a lane change occurs, a spin is caused as shown by reference numeral 510.

Figure 6:
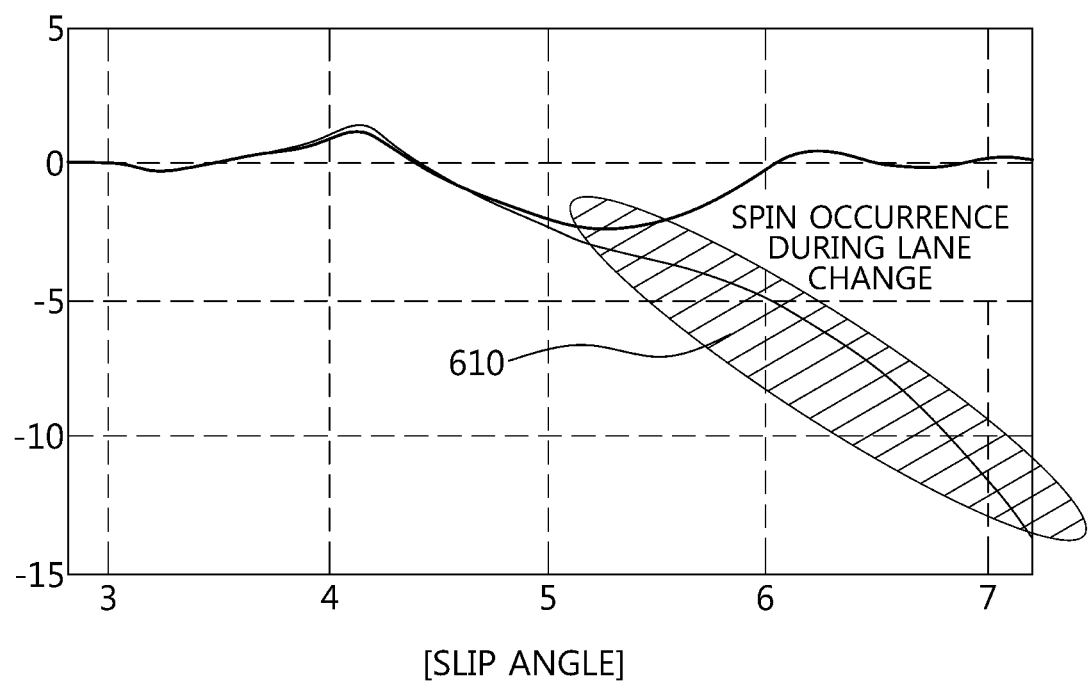
FIG. 6 is a graph illustrating a performance analysis result during lane change after it has been determined that a current driving state is a low-friction driving state, as a function of a slip angle according to an exemplary embodiment of the present invention.

FIG. 6 is a graph illustrating a performance analysis result during lane change after it has been determined that the current driving state is the low-friction driving state, as a function of a slip angle according to an exemplary embodiment of the present invention. Referring to FIG. 6, in the low-friction driving state, when a lane change occurs, a spin is caused as shown by reference numeral 610.

Furthermore, the methods or the steps of algorithm described with reference to the exemplary embodiments proposed in this specification may be implemented in the form of program instructions executable through various computer systems and may be recorded in a non-transitory computer-readable medium. The non-transitory computer-readable medium may also include program (instruction) codes, data files, data structures, and the like independently or in the form of combination.

The program (instruction) codes recorded in the medium may be specially designed and constructed for the present invention, or may be well-known and available to those skilled in the computer software arts. Examples of the computer-readable medium may include magnetic media such as hard disks, floppy disks, and magnetic tape; optical media such as CD ROM disks, DVD, blu-ray disks; and semiconductor memory devices such as read-only memory (ROM), random access memory (RAM), and flash memory, which are specialized to store and perform program (instruction) codes. Examples of program (instruction) codes may include not only machine codes produced by a compiler but also high-level language codes capable of being executed by a computer using an interpreter or the like. The described hardware devices may be configured to operate as one or more modules or units to perform the operations of the above-described embodiments, and vice versa.

As described above, in an exemplary embodiment of the present invention, the steering stability of a vehicle may be enhanced by increasing roll/lateral force steer and cornering force in response to determining that the vehicle is in a low-friction driving state. In addition, the tire grip limit range and/or the cornering force may be increased by offsetting load shift resulting from steering. Deformation of a suspension may be induced by a rear-wheel reverse-phase control operation, whereby roll steer/lateral force steer may be secured. Hence, under-steer may be increased, and/or the vehicle stability may be enhanced. In an exemplary embodiment, the tire grip limit range may be increased, and/or the spin-out phenomenon may be prevented. In addition, a roll moment loss due to the rear-wheel reverse-phase control operation may be compensated for by increasing a front wheel control rate, whereby roll angle response characteristics may remain constant, and/or roll unfamiliarity may be prevented from occurring.

While the present invention has been described with respect to the exemplary embodiments, it will be apparent to those skilled in the art that various changes and modifications may be made without departing from the spirit and scope of the invention as defined in the following claims.

What is claimed is:

1. An active roll control apparatus, comprising:
   a first actuator disposed adjacent to front wheels or rear wheels, and configured to adjust roll stiffness;
   a second actuator disposed adjacent to the front wheels or rear wheels, and configured to adjust foil stiffness; and
   a controller configured to operate the first actuator and the second actuator,
   wherein the first actuator is disposed adjacent to the rear wheels,
   wherein the second actuator is disposed adjacent to the front wheels,
   wherein the controller is configured to operate the first actuator in a reverse phase control manner to the rear wheels in a roll angle increasing direction and is configured to operate the second actuator in a control rate increasing operation to the front wheels when a vehicle is in a low-friction turning driving state.

2. The active roll control apparatus of claim 1, further comprising:
   a vehicle sensor configured to generate vehicle state information,
   wherein the controller is configured to determine whether the vehicle is in the low-friction turning driving state using the vehicle state information.

3. The active roll control apparatus of claim 2, wherein the vehicle state information includes a vehicle speed, a steering angle, and a lateral acceleration, and wherein the determination of whether the vehicle is in the low-friction turning driving state is performed by comparing a preset reference value and an estimation error between an actual lateral acceleration value and an estimation lateral acceleration value estimated based on the vehicle speed and the steering angle.

4. The active roll control apparatus of claim 3, wherein the estimation lateral acceleration value is calculated using an Ackermann vehicle model, which is a 2-degree-of-freedom vehicle dynamics model.

5. The active roll control apparatus of claim 1,
wherein the controller is configured to operate the second actuator in a roll angle reducing direction at a control rate greater than a control rate used when the vehicle is in a normal turning driving state.

6. The active roll control apparatus of claim 1, wherein, under fine steering conditions, the first actuator is prevented from being operated in the reverse phase manner in the roll angle increasing direction.

7. The active roll control apparatus of claim 6, further comprising:
a vehicle sensor configured to generate vehicle state information,
wherein the controller is configured to determine whether the vehicle is under the fine steering conditions using the vehicle state information.

8. The active roll control apparatus of claim 7, wherein the vehicle state information includes a vehicle speed, a lateral acceleration, a yaw rate, a steering angle, and a steering angular speed, and wherein the determination of whether the vehicle is in the fine steering conditions is performed using the vehicle speed, the lateral acceleration, the yaw rate, the steering angle, and the steering angular speed.

9. An active roll control apparatus, comprising:
a vehicle sensor configured to generate vehicle state information;
a first actuator disposed adjacent to front wheels and configured to adjust roll stiffness;
a second actuator disposed adjacent to rear wheels and configured to adjust roll stiffness; and
a controller configured to determine whether a vehicle is in a low-friction driving state using the vehicle state information, and operate the first actuator and the second actuator to perform a steering stability improvement control operation or a normal control operation based on a result of the determination,
wherein the controller is configured to operate the first actuator in a reverse phase control manner to the rear wheels in a roll angle increasing direction and is configured to operate the second actuator in a control rate increasing operation to the front wheels when the vehicle is in the low-friction turning driving state.

10. An active roll control method, comprising:
determining, by a controller, whether the vehicle is in a low-friction turning driving state using vehicle state information generated by a vehicle sensor;
performing, by the controller, a reverse phase control operation in a roll angle increasing direction to rear wheels and as control rate increasing operation to front wheels when a vehicle is in a low-friction turning driving state; and
adjusting, by a first actuator disposed adjacent to front wheels or rear wheels, roll stiffness based on the reverse phase control operation.

11. The active roll control method of claim 10, wherein the vehicle state information includes a vehicle speed, a steering angle, and a lateral acceleration, wherein the determination of whether the vehicle is in the low-friction turning driving state is performed by comparing a preset reference value and an estimation error between an actual lateral acceleration value and an estimation lateral acceleration value estimated based on the vehicle speed and the steering angle.

12. The active roll control method of claim 11, wherein the estimation lateral acceleration value is calculated using an Ackermann vehicle model, which is a 2-degree-of-freedom vehicle dynamics model.

13. The active roll control method of claim 10, wherein, under fine steering conditions, the first actuator is prevented from performing the reverse phase control operation in the roll angle increasing direction.

14. The active roll control method of claim 13, further comprising:
determining, by the controller, whether the vehicle is under fine steering conditions using vehicle state information generated by a vehicle sensor.

15. The active roll control method of claim 14, wherein the vehicle state information includes a vehicle speed, a lateral acceleration, a yaw rate, a steering angle, and a steering angular speed, and wherein the determination of whether the vehicle is in the fine steering conditions is performed using the vehicle speed, the lateral acceleration, the yaw rate, the steering angle, and the steering angular speed.

16. The active roll control method of claim 10, wherein the first actuator is disposed adjacent to the rear wheels.

17. An active roll control method, comprising:
generating, by a vehicle sensor, vehicle state information;
determining, by a controller, whether a vehicle is in a low-friction driving state using the vehicle state information;
performing, by the controller, a steering stability improvement control operation or a normal control operation based on a result of the determination; and
adjusting, by a first actuator disposed adjacent to front wheels and a second actuator disposed adjacent to rear wheels, roll stiffness based on the steering stability improvement control operation or the normal control operation,
wherein the steering stability improvement control operation is performed, by the controller, wherein a reverse phase control operation is executed in a roll angle increasing direction to the rear wheels and a control rate increasing operation is executed to the front wheels when the vehicle is in a low-friction turning driving state.

* * * * *